Patented May 31, 1932

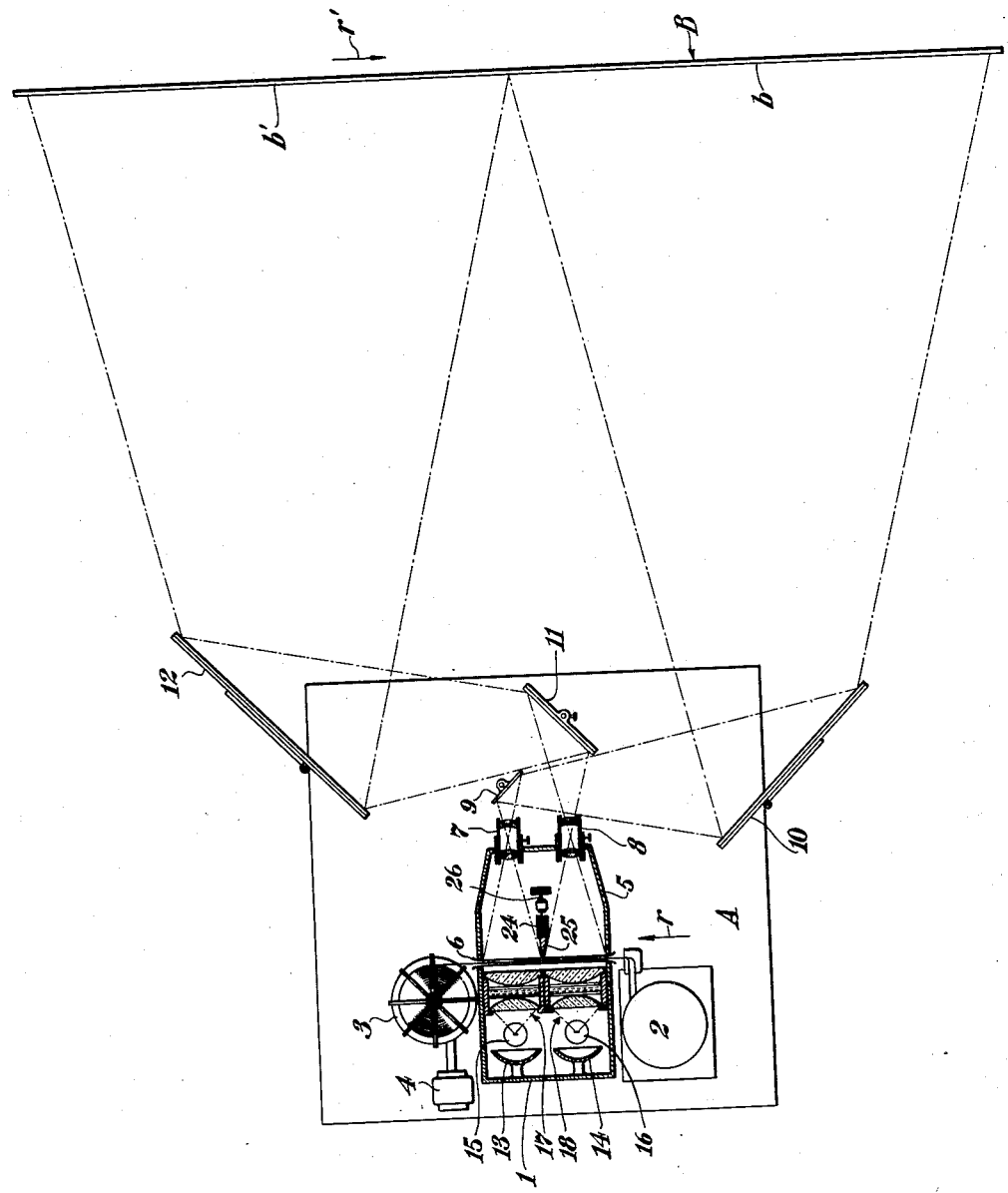

1,860,951

UNITED STATES PATENT OFFICE

BARTON A. PROCTOR, OF PELHAM, NEW YORK, ASSIGNOR TO NEWS PROJECTION CORPORATION, OF NEW YORK, N. Y., A CORPORATION OF NEW YORK

MULTIPLE PROJECTING DEVICE

Application filed June 21, 1927. Serial No. 200,314.

This invention relates to projecting machines in general and more especially to projecting machines for simultaneously projecting successive portions of a film, ticker tape or the like, such as disclosed in my Patent No. 1,666,304, issued April 17th, 1928.

Among the objects of the present invention it is aimed particularly to provide an improved device by means of which a plurality of successive portions of a moving film, ticker tape or the like may be simultaneously projected with a minimum requirement of adjustment and without overlapping of images.

Among the objects of the present invention it is also aimed to provide an improved device by means of which a plurality of successive portions of a moving film, ticker tape or the like may be simultaneously projected without distortion.

Specifically the invention aims to provide an improved device by means of which two successive portions of a moving film, ticker tape or the like may be simultaneously projected with a minimum requirement of adjustment by the aid of mirrors.

These and other features, capabilities and advantages of the invention will appear from the subjoined detailed description of the specific embodiment thereof illustrated in the accompanying drawing, in which The drawing is a diagrammatic plan of one embodiment of the improved device.

In the embodiment shown in the drawing, there is provided a platform A and a screen B. On the platform A there is mounted the lamp housing portion 1, to the right thereof the ticker generally designated by the reference character 2, and to the left thereof the rewind reel 3 operatively connected to the motor 4. To the front of the lamp housing portion 1 there is mounted the rays guiding housing portion 5, between which housing portions 1 and 5 there is formed the tape guideway 6.

The housing portion 5 is provided with two projecting lens devices 7 and 8 at the front end thereof. In registration with the lens device 7 there is provided the mirror 9 mounted on the platform A, which mirror 7 is adapted to cooperate with the mirror 10 to the right thereof and mounted on the right hand end of the platform A. In registration with the lens device 8 there is provided the mirror 11 which mirror 11 is adapted to cooperate with the mirror 12 to the left thereof and mounted on the left hand end of the platform A. The arrangement of mirrors is such that the projection from the lens device 7 at the left hand side of the housing portion 5 cooperates with the mirrors 9 and 10 to form an image on the area $b$, the right hand area of the screen B, and the lens device 8 at the right hand side of the housing portion 5 cooperates with the mirrors 11 and 12 to form an image on the area $b'$, the left hand area of the screen B. It will also be apparent that the mirror 9 is disposed at an angle of forty-five degrees to the path of the light beam from the lens 7, that the mirror 10 is disposed at an angle of forty-five degrees to the area $b$ of the screen B, and that the mirrors 9 and 10 are parallel to one another, and similarly that the mirror 11 is disposed at an angle of forty-five degrees to the path of the light beam from the lens 8, that the mirror 12 is disposed at an angle of forty-five degrees to the area $b'$ of the screen B, and that the mirrors 11 and 12 are parallel to one another from which it follows that distortion of the images will be positively eliminated.

In the housing portion 1, there are provided at the rear end thereof two reflectors 13 and 14 which are disposed in the left hand and right hand portions respectively of the housing member 1. To the front of the reflectors 13 and 14, and in registration therewith, there are provided the lamps 15 and 16 respectively. To the front of the lamps 15 and 16 and in registration therewith, there are provided the condenser lens series 17 and 18 respectively, each of which, as shown in the drawing, consists of a plano-convex lens 19, a water cell 20, and a second plano-convex lens 21 having flattened ends 22.

The lamps 15, 16, and condenser lens series 17, 18, are preferably supported on a bracket 23, which has extending upwardly therefrom, substantially in registration with the adjacent flattened ends 22 of the lenses 21, the supports 24 slidably to receive the partition 25 which is provided with the adjusting device 26 by means of which the position of the partition 25 is controlled. The lens series 17 and 18 are provided with two sheet metal cover portions 27, 27' spaced from one another to form the horizontal light opening 28 registering with the guideway 6 for the tape T. In the operation of the device, the partition 25 is preferably disposed in engagement with the guideway 6, as shown in the drawing.

The objective lens series 7 and 8 register with the condensing lens series 17 and 18 respectively.

As shown in the drawing, the mirror 9 is mounted rearwardly of the mirror 11, and the mirror 11 is disposed sufficiently forward of the mirror 9 to permit the light rays from the mirror 9 to pass unobstructed between the lens series 8 and the mirror 11 on its way to the mirror 10. On account of the distance of travel of the several light rays, the mirrors 9, 10, 11 and 12 have different areas, the mirror 9 being smallest, the mirror 11 larger, the mirror 10 still larger, and the mirror 12 largest. The several mirrors 9, 10, 11 and 12 are preferably adjustably mounted in order to facilitate positioning the same to obtain accurate projections on the screen B. By means of this arrangement of the mirrors relative to the screen B, and the source of projection, the images will receive two deflections, each a deflection of ninety degrees, and consequently since the distance of travel of the rays from the source of light will be equal, and each pass through the same number of mirrors, the resulting images on the areas $b$ and $b'$ will be free from any distortion, will be equal in size, and equal in intensity. Furthermore, with the arrangement aforesaid, the tape moving from the ticker 2 through the guideway 6 toward the rewind reel 3 in the direction of the arrow $r$ will be projected right side up on the screen B before moving in the opposite direction, the direction of the arrow $r'$, the successive portions of the tape passing the condensing lens series 18 and 17, being projected onto the areas $b'$ and $b$ respectively as a single uninterrupted section of tape, the partition 25 functioning so that the images from the successive portions of tape will be absolutely protected against overlapping.

It is obvious that various changes and modifications may be made to the details of construction without departing from the general spirit of the invention as set forth in the appended claim.

I claim:

The combination with a ticker tape, of light projecting means, two adjacent light projecting locations for receiving the light rays from said light projecting means, means for feeding the ticker tape past said light projecting locations, two objective lenses, one of said lenses for each light projecting location for forming images of the successive characters on the tape, a screen, and two pairs of mirrors, one mirror of one pair disposed at an angle of forty-five degrees to the beam of light rays issuing from one of said lenses and receiving the images from said lens and deflecting them at right angles to the other mirror of such pair, disposed to the right of such lens, the other mirror of such pair being disposed at an angle of forty-five degrees to said screen and deflecting the images received at right angles to said screen, and one mirror of the other pair of mirrors disposed at an angle of forty-five degrees to the beam of light rays issuing from the other of said lenses and to the left of the second mirror of said first pair and similarly receiving the images from said latter lens and deflecting the same at right angles onto the other mirror of said second pair disposed to the left of the first mirror of said first pair, said other mirror of said second pair being disposed at an angle of forty-five degrees to said screen and similarly deflecting the images received at right angles on to said screen.

BARTON A. PROCTOR.